US012755290B2

(12) United States Patent
Matthews et al.

(10) Patent No.: US 12,755,290 B2
(45) Date of Patent: Oct. 6, 2026

(54) METHODS AND SYSTEMS FOR A VIRTUAL ASSISTANT

(71) Applicant: U.S. Bancorp, National Association, Minneapolis, MN (US)

(72) Inventors: Bradley O. Matthews, Minneapolis, MN (US); Tory K. Passons, Minneapolis, MN (US)

(73) Assignee: U.S. Bank National Association, Minneapolis, MN (US)

( * ) Notice: Subject to any disclaimer, the term of this patent is extended or adjusted under 35 U.S.C. 154(b) by 336 days.

(21) Appl. No.: 18/472,009

(22) Filed: Sep. 21, 2023

(65) Prior Publication Data

US 2024/0013228 A1 Jan. 11, 2024

Related U.S. Application Data

(63) Continuation of application No. 17/466,764, filed on Sep. 3, 2021, now Pat. No. 11,810,120, which is a continuation of application No. 16/369,697, filed on Mar. 29, 2019, now Pat. No. 11,113,696.

(51) Int. Cl.
*G06Q 20/40* (2012.01)
*G06Q 10/02* (2012.01)
*G06Q 20/32* (2012.01)

(52) U.S. Cl.
CPC .......... *G06Q 20/405* (2013.01); *G06Q 10/02* (2013.01); *G06Q 20/3223* (2013.01)

(58) Field of Classification Search
CPC ... G06Q 20/405; G06Q 10/02; G06Q 20/3223
See application file for complete search history.

(56) References Cited

U.S. PATENT DOCUMENTS

| | | | | |
|---|---|---|---|---|
| 8,359,239 | B1 | 1/2013 | Cook et al. | |
| 8,572,072 | B1 * | 10/2013 | Roumeliotis | G06F 16/353 707/722 |
| 9,578,173 | B2 | 2/2017 | Sanghavi et al. | |
| 9,779,384 | B2 * | 10/2017 | Fredericks | G06Q 40/12 |
| 9,843,521 | B2 | 12/2017 | Kamat et al. | |
| 9,843,621 | B2 | 12/2017 | Thapar | |
| 9,864,990 | B2 | 1/2018 | Hutchison et al. | |
| 10,185,955 | B1 | 1/2019 | Koeppel et al. | |
| 10,909,637 | B1 | 2/2021 | Neveu et al. | |
| 11,321,784 | B2 * | 5/2022 | Verma | G06Q 40/12 |
| 11,568,497 | B2 * | 1/2023 | Neveu | G06Q 40/12 |

(Continued)

*Primary Examiner* — Matthew S Gart
*Assistant Examiner* — William D Newlon
(74) *Attorney, Agent, or Firm* — Foley & Lardner LLP

(57) ABSTRACT

An illustrative embodiment disclosed herein is a method including assigning, by a virtual assistant computing device, a transaction intent associated with a mobile device user for a transaction and determining by the virtual assistant computing device, whether the transaction is in accordance with policy. The method further includes sending by the virtual assistant computing device, a policy decision recommendation to the mobile device and receiving, by the virtual assistant computing device, a response from the mobile device indicating whether to perform the transaction. The method further includes facilitating, by the virtual assistant computing device, performance of the transaction and generating, by the virtual assistant computing device, an expense report associated with the transaction.

22 Claims, 7 Drawing Sheets

(56) References Cited

U.S. PATENT DOCUMENTS

| | | | | |
|---|---|---|---|---|
| 11,797,604 | B1 * | 10/2023 | Nagalla | G06F 16/2379 |
| 2003/0167167 | A1 | 9/2003 | Gong | |
| 2007/0219879 | A1 * | 9/2007 | Furlong | G06Q 10/00 705/30 |
| 2007/0282674 | A1 | 12/2007 | Gomes et al. | |
| 2008/0313063 | A1 * | 12/2008 | Testa | G06Q 10/107 705/30 |
| 2010/0017316 | A1 * | 1/2010 | Joseph | G06Q 10/10 705/30 |
| 2012/0185368 | A1 | 7/2012 | Schloter et al. | |
| 2012/0317003 | A1 * | 12/2012 | McGrane | G06Q 10/06 705/30 |
| 2014/0244503 | A1 | 8/2014 | Sadlier | |
| 2015/0006271 | A1 | 1/2015 | Oppenheim et al. | |
| 2015/0242931 | A1 | 8/2015 | Stoll et al. | |
| 2015/0302531 | A1 | 10/2015 | Thier et al. | |
| 2016/0078561 | A1 * | 3/2016 | Farrell | G06Q 40/12 705/30 |
| 2017/0116598 | A1 | 4/2017 | Bauer et al. | |
| 2017/0200234 | A1 | 7/2017 | Morse et al. | |
| 2019/0102707 | A1 | 4/2019 | Wald | |
| 2019/0147543 | A1 | 5/2019 | Cerri et al. | |
| 2019/0295158 | A1 * | 9/2019 | Wu | H04W 4/029 |
| 2020/0058078 | A1 | 2/2020 | Li et al. | |
| 2020/0233857 | A1 * | 7/2020 | Fehling | G06Q 10/06315 |
| 2021/0398129 | A1 * | 12/2021 | Sharma | G06N 3/08 |

* cited by examiner

METHODS AND SYSTEMS FOR A VIRTUAL ASSISTANT

CROSS REFERENCE TO RELATED APPLICATIONS

The present application claims the benefit of priority as a continuation to U.S. application Ser. No. 17/466,764, filed Sep. 3, 2021, which claims the benefit of priority as a continuation to U.S. application Ser. No. 16/369,697, filed Mar. 29, 2019, the entirety of each of which is incorporated by reference herein.

BACKGROUND

The following description is provided to assist the understanding of the reader. None of the information provided or references cited is admitted to be prior art.

Planning travel for an employee of an enterprise or hiring candidate involves multiple travel-related systems of the enterprise and third parties, such as card payment systems, travel management systems, and expense reporting systems. Conventional travel-related systems require human intervention by employees of an enterprise and third parties. Thus, the conventional travel-related systems are prone to error. The conventional travel-related systems are not integrated with each other. Thus, there is a lot of overhead. Documents are duplicated for multiple systems and authorizations are made by multiple people.

SUMMARY

Aspects of the present disclosure relate generally to computer systems, and more particularly to a methods and systems for a virtual assistant. The technical advantage is an improvement in resource utilization, network latency, and network bandwidth.

An illustrative embodiment disclosed herein is a method including assigning, by a virtual assistant computing device, a transaction intent associated with a mobile device user for a transaction and determining by the virtual assistant computing device, whether the transaction is in accordance with policy. The method further includes sending by the virtual assistant computing device, a policy decision recommendation to the mobile device and receiving, by the virtual assistant computing device, a response from the mobile device indicating whether to perform the transaction. The method further includes facilitating, by the virtual assistant computing device, performance of the transaction and generating, by the virtual assistant computing device, an expense report associated with the transaction.

Another illustrative embodiment disclosed herein is an apparatus including a processor having programmed instructions to assign a transaction intent associated with a mobile device user for a transaction and determine whether the transaction is in accordance with policy. The processor has further programmed instructions to send a recommendation to perform the transaction to the mobile device and receive a response from the mobile device indicating whether to perform the transaction. The processor has further programmed instructions to facilitate performance of the transaction and generate an expense report associated with the transaction.

Further details of aspects, objects, and advantages of the invention are described below in the detailed description, drawings, and claims. Both the foregoing general description and the following detailed description are exemplary and explanatory and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
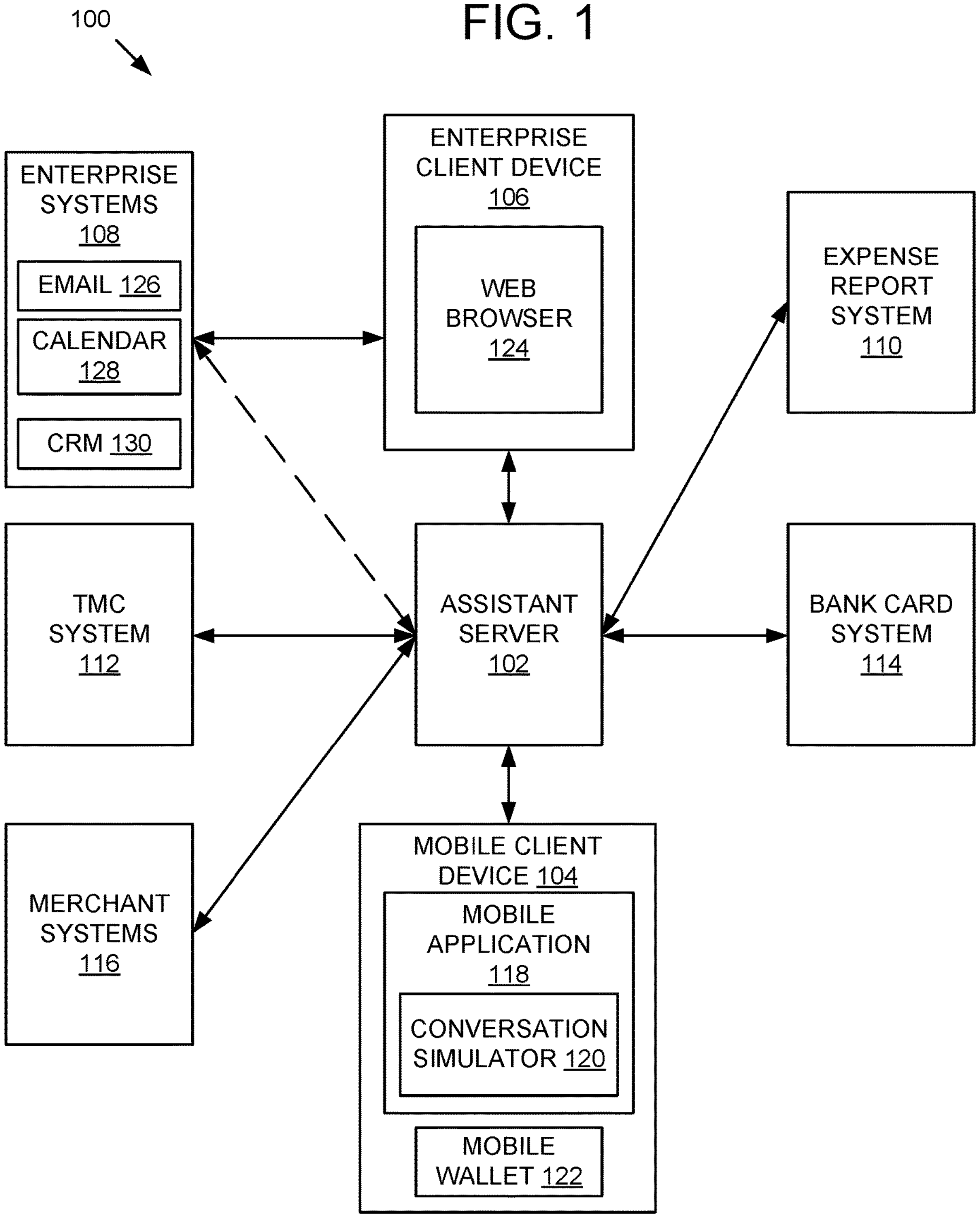
FIG. 1 illustrates an example embodiment of a virtual assistant, according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Planning travel for an employee of an enterprise or hiring candidate involves multiple travel-related systems of the enterprise and third parties, such as card payment systems, travel management systems, and expense reporting systems. Conventional travel-related systems require human intervention by employees of an enterprise and third parties. Thus, the conventional travel-related systems are prone to error. In one example, a travel manager can purchase a flight ticket that does not meet the needs of the employee or hiring candidate who will board the flight. In another example, a receipt for an expense report can be lost, a receipt can be forgotten, and a receipt can include only a total without itemization. Furthermore, conventional travel-related systems are not integrated with each other, resulting in significant overhead. Documents are duplicated for multiple systems and authorizations are made by multiple people. When requests for travel or expense report are made, data needs to be gathered from various sources. There are technical problems associated with the conventional travel-related systems. The error and the redundancy burden the servers and networks for these systems. Due to error and redundancy, more communications are sent between clients and servers, causing a reduction in available network bandwidth. By having files located in multiple remote locations, more hardware resources are utilized and network latency in fetching data is increased. Furthermore, because there are many clients and servers to traverse, there is an increased network latency in completing requests such as a request to purchase a ticket or to fill an expense report. There are also security concerns. A hiring candidate's personally identifiable information may be revealed to the enterprise. The systems are not equipped to hide a hiring candidate's personally identifiable information from the enterprise.

Disclosed herein are systems and methods for a virtual assistant. The virtual assistant provides technical solutions to the aforementioned technical problems. The virtual assistant minimizes human error by using artificial intelligence to determine the context of a travel-related event or transaction and a policy manager to verify that the transaction expense is in accordance with enterprise and third party policies. The virtual assistant knows when to make travel arrangements based on calendar or customer relationship management entries and performs tasks based on this knowledge. For instance, it can watch for better airline seats and auction them. Likewise, it can call for a car if an employee has landed at the airport and does not have a rental car. Finally, the virtual assistant automatically generates an expense report. The virtual assistant minimizes error by using artificial intelligence to make decisions and track travel data. The virtual assistant also minimizes redundancy by storing all relevant data in a centralized database. By minimizing error and redundancy and storing the data on a centralized server, less data needs to be sent or re-sent across private and public networks, increasing network bandwidth. Moreover, with a reduction of redundant data, less storage resources are needed to store the data and less processing resources are needed to execute instructions for storing, fetching, and processing data. Furthermore, having the data stored locally to the enterprise reduces network latency when fetching the data. Moreover, the virtual assistant is capable of performing travel-related operations without revealing a candidate's personally identifiable information to an enterprise.

Referring now to FIG. 1, a virtual assistant system 100 is shown, in accordance with some embodiments. In brief overview, the virtual assistant system 100 includes the assistant server 102, the mobile client device 104, the enterprise client device 106, the enterprise systems 108, the expense report system 110, the travel management company (TMC) system 112, the bank card system 114, and the merchant systems 116. The mobile client device 104 may include a mobile application 118 including a conversation simulator 120. The mobile client device 104 may further include a mobile wallet 122. The enterprise client device 106 may include a web browser 124. The enterprise systems 108 may include enterprise data such as email 126, a calendar 128, and customer relationship management (CRM) data 130. CRM data 130 may be referred to herein as CRM 130.

The assistant server 102 is configured to provide assistance to the user of the mobile client device 104. The assistant server 102 may be configured to assist in scheduling a meeting, booking a flight, renting a car, reserving a ride-share, purchasing a meal, submitting an expense report, and the like. The assistant server 102, in tandem with other systems, may be configured to coordinate a business trip end-to-end, including planning the itinerary, making payments to merchants, and completing an expense report.

Figure 2:
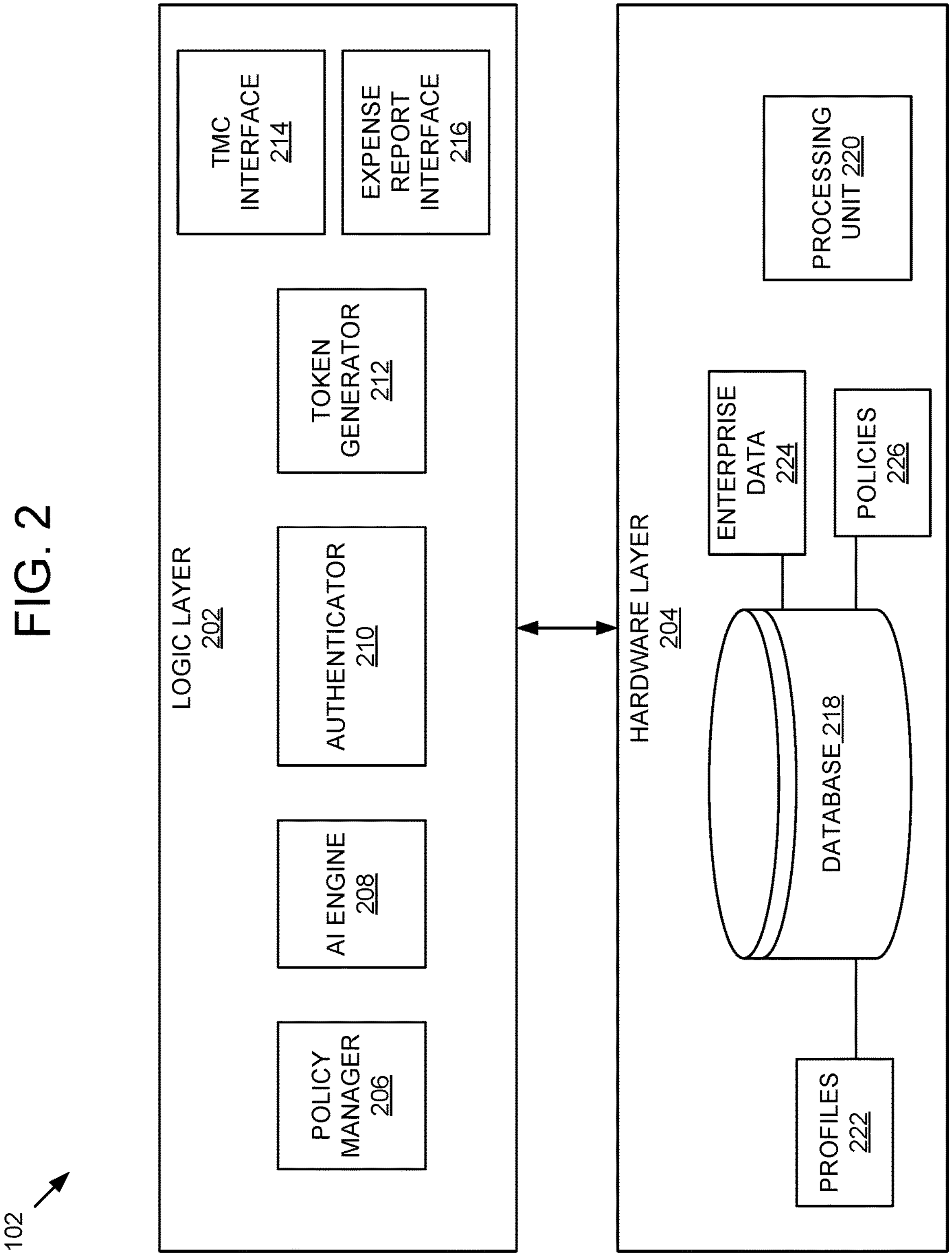
FIG. 2 illustrates an example embodiment of an assistant server, according to some embodiments.

Referring now to FIG. 2, assistant server 102 is shown, in accordance with some embodiments. The assistant server 102 is same as the assistant server 102 depicted in and described with respect to FIG. 1. In brief overview, the assistant server 102 includes a logic layer 202 and a hardware layer 204. The logic layer 202 may include a policy manager 206, an artificial intelligence (AI) engine 208, an authenticator 210, a token generator 212, a TMC interface 214, and an expense report interface 216. The hardware layer 204 includes a database 218 and a processing unit 220. The database may further include profiles 222, the enterprise data 224, and the policies 226.

The logic layer 202 may include a policy manager 206. The policy manager 206 may be configured to identify one or more policies 226 to apply to a request such as a request for a card, a request for a transaction, an expense report submission request, or the like. The policy manager 206 may be configured to identify the one or more policies 226 to apply to the request based on a user. For example, a first policy may be provided for a user that is a frequent traveler, a second policy may be provided for an employee user that is an infrequent traveler, and a third policy may be provided for a user that is a hiring candidate. The policy manager 206 may be configured to identify the one or more policies 226 to apply to the request based on a location of the enterprise client device. For example, a first policy may be provided for an enterprise client device located in the eastern time zone, and a second policy may be provided for an enterprise client device located in the western time zone. The policy manager 206 may be configured to identify the one or more policies 226 to apply to the request based on an identity of the bank card system 114 determining whether to issue a card. For example, the database 218 may have multiple policies including a first policy from a first bank and a second policy from a second bank. The policy manager 206 may apply the policy of the bank associated with the determination of whether to issue the card. In some embodiments, the policy manager 206 or another component of the virtual assistant queries a human such as an accountant. If the human waives the maximum amount, the human's response may be included in the waiver validating response.

The policy manager 206 may be configured to compare a parameter in the request (e.g. a card limit, an expiration, an amount to be spent, or a means for authentication such as a password) to one or more parameters of the identified one more policies 226. For example, a request to issue a card with a limit may be compared to a maximum limit in a policy associated with the bank card system 114. The maximum limit may also be based on a policy associated with a hotel, restaurant, or other institution at which a user of the card wishes to spend money. The policy manager 206 may be configured to make a determination based on the comparison. For example, responsive to the requested limit being higher than the maximum limit, the policy manager 206 may determine that the card cannot be issued. The policy manager 206 may be configured to determine whether an item purchased qualifies under an allowed category in accordance with the policy 226. For example, alcoholic beverages may be an item which does not qualify under meal purchases. The user may purchase an alcoholic beverage, such as a bottle of wine, at a dinner with a customer. The policy manager 206 may determine that the alcoholic beverage does not qualify under the category of meal and may deny the transaction. In some embodiments, the policy manager 206 sends the item and a list of categories to the AI engine 208 to determine whether the item qualifies under one of the categories and the policy manager 206 receives a response including the determination from the AI engine 208.

The policy manager 206 may be configured to request more information in response to determining that a parameter is not in accordance with policy. The policy manager 206 may be configured to request more information in response to determining that a requested amount exceeds a threshold of the policy 226. For example, the user may initiate a transaction by purchasing a meal using the virtual card in the mobile wallet 122. The policy manager 206 may compare the amount in the transaction to a maximum amount for meals, for a transaction or in a time interval (e.g. in an hour, in a day, for the whole trip), in the policy 226 and determine that the requested amount exceeds the maximum amount. The policy manager 206 may ask the user why the user is purchasing a meal above the maximum amount. Responsive to receiving a validating response from the user, the policy manager 206 may be configured to waive the maximum amount or to temporarily increase the maximum amount. The waiver validating response may include detailing an importance of an event associated with the transaction or reciting that a manager gave prior authorization.

The policy manager 206 may be configured to communicate with the conversation simulator 120 (e.g. a chatbot). In some embodiments, the conversation simulator 120 polls the policy manager 206 with a request that stays open until the policy manager 206 responds with the message, at which point a first connection between the policy manager 206 and the conversation simulator 120 is closed. A new connection is requested by the conversation simulator 120 (and a response to the message is sent by the conversation simulator 120) responsive to the first connection closing. The policy manager 206 may be configured to communicate with the conversation simulator 120 by establishing a persistent connection (e.g. using web sockets). Upon establishing the persistent connection, the policy manager 206 may send a message to the conversation simulator 120 including the determination made by the policy manager 206 (e.g. approve or deny a transaction, forward or deny a request for issuing a card) or a query by the policy manager 206 (a request for more information). Upon sending the message, the policy manager 206 may be configured to not send further messages until receiving a response from the conversation simulator 120. The policy manager 206 may send the message in accordance with HyperText Transfer Protocol (HTTP), as an HTTP request or response. The policy manager 206 may send the message as a human-friendly text or as an encoded message to be decoded by the conversation simulator 120. For example, the message may be sent as a string of character delimited codes, and each code may correspond to a word or phrase in a lookup table (LUT) located in the assistant server 102 or the mobile client device 104.

The policy manager 206 may be configured to determine whether an expense report is to be generated for a trip or for a single transaction. The policy manager 206 may be configured to identify the enterprise policy 226 that has rules for whether an expense report is to be generated for a trip or for a single transaction. The policy manager 206 may be configured to read a value at a particular index or variable. For example, the enterprise policy 226 may specify an expense report type in a variable "expense report type." The value associated with the variable may be a first value for a trip expense report and a second value for a transaction expense report. The policy manager 206 may be configured to determine a type of expense report (e.g. trip or transaction) in response to receiving an indication of an initiated or completed transaction or a request for a transaction. The policy manager 206 may be configured to apply the identified enterprise policy 226 to the transaction or transaction request that is received by the policy manager 206. The policy manager 206 may determine whether an expense report is to be generated for a trip or for a single transaction based on context. The context may be time-related. The context of a meal purchase may include travel dates. For example, if a user travels somewhere on a first date and returns on second date, the policy manager 206 may determine that any expenses by the user in between the first date and the second date are part of the same trip. Thus, the policy manager 206 may generate a trip expense report that includes the expenses accrued during the days of travel. This may include the travel costs (e.g. plane tickets) as well. The policy manager 206 may determine whether an expense report is to be generated for a trip or for a single transaction based on role of the user. For example, if a purchase is made by a user in the sales department, the policy manager 206 may determine that the purchase is part of a trip expense. Accordingly, the policy manager 206 may determine that an expense report for a trip should be created. On the other hand, if a purchase is made by a user in the information technology department, the policy manager 206 may determine that an expense report should be completed for only that purchase.

The logic layer 202 may include the AI engine 208. The AI engine 208 may be configured to perform AI based context capture by obtaining context associated with a trip or a transaction. As defined herein, context is any additional information found in the enterprise data, geolocation, or other data, that is associated with the trip or the transaction or that may narrow a scope of the trip or the transaction. The AI engine 208 may be configured to perform context capture in real time (e.g. immediately responsive to a transaction or request for a transaction occurring).

The AI engine 208 may be configured to identify entries of the enterprise data (e.g. the email 126, the calendar 128, and the CRM 130) in the database 218 or the enterprise systems 108. The AI engine 208 may be configured to identify the entries by comparing one or more parameters of the transaction data to one or more parameters of each of the entries of the enterprise data. The transaction data may be a voice-initiated request, a text request, an invoice, a receipt, or the like. Parameters may be places, times, people, modes of transportation, and the like. For example, the transaction may be for a flight to ticket to New York on June 1. The parameters "New York" and "Jun. 1, 2020" may be parameters of the transaction data. The AI engine 208 may be configured to identify entries having parameters including "New York" and "Jun. 1, 2020." The AI engine 208 may be configured to parse sentences in the transaction data and entries into the one or more parameters. The AI engine 208 may be configured to add metadata to the one or more parameters. The metadata may identify each of the one or more parameters as a type of object (e.g. place, time, people, mode of transportation). The metadata may be determined based on the AI engine 208 determining the context of the sentence including the one or more parameters. For example, an email may include a first sentence, "meeting next week with January to finalize the dinner details." The AI engine 208 may determine that the second parameter "January" is a person based on the context of the first sentence. The AI engine 208 may generate a metadata value identifying "January" as a person and associate the metadata value with the parameter "January." In some embodiments, the one or more parameters are the words in the sentences. In some embodiments, the one or more parameters are encoded identifiers (e.g. number value and/or hash) that are mapped to human friendly language (e.g. words, phrases, or sentences) in the transaction data or the entries in the enterprise data.

The AI engine 208 may be configured to learn the intent of the one or more parameters of the transaction data and/or entries. The AI engine 208 may use a training model to recognize the intent of the more parameters. The training models may include linear regression, logistic regression, decision tree, Bayes, k-means, and the like. The AI engine 208 assigns the intent to a mobile device of a user associated with the transaction data and/or the entries in the enterprise data. Thus, the transaction data and/or the entries are indicative of the user's intent. The AI engine 208 may learn the intent by identifying, parsing, adding metadata, mapping, and the like, as described in the preceding paragraph.

The AI engine 208 may be configured to determine a trip, a purpose of the trip, and/or an event associated with the transaction based on the context in the identified entries. The AI engine 208 may be configured to identify actions that give context to the transaction. The action may be responsive to the intent of the user. The action may include a word that is a verb and that is in proximity of one of the parameters (e.g. within five words of one of the parameters). The AI engine 208 may be configured to identify objects that are being modified by the action. An object may include a word that is a noun that is being modified by the action (e.g. the verb). For example, a calendar entry identified by the AI engine 208 may include details such as "business trip on June 1 for pitching driverless car project." An email correspondence identified by the AI engine 208 may include details such as "going to New York to secure funding from Bob." The AI engine 208 may determine that the purpose of the trip is "to secure funding from Bob for the driverless car project."

The AI engine 220 may be configured to auto detect a new trip. For example, if the AI engine 220 detects that a qualifying transaction has occurred (e.g. flight ticket or train ticket has been purchased), the AI engine 220 detects a new trip. The AI engine 220 may be configured to detect the qualifying transaction occurred by receiving indication of the qualifying transaction (e.g. from the mobile client device 104, the enterprise client device 106, the TMC system 112, the bank card system 114, or the like). The AI engine 220 may be configured to detect the qualifying transaction occurred by determining that the indicated transaction is not associated with any trip that has a pending state. The AI engine 220 may detect a new trip based on receiving a qualifying transaction request in the same way that the AI engine 220 may detect a new trip based on the qualifying transaction has occurred. The AI engine 220 may be configured to auto detect a new trip using a geolocation API discussed herein.

The AI engine 208 may be able to predict an event or a recommended transaction based on context. For example, the AI engine 208 may determine based on context that the user may be getting ready to check out from a hotel he is staying at. The AI engine 208 may retrieve from a data entry associated with the trip a previously stored invoice that indicates the anticipated time of check out. Based on the previously stored invoice, the AI engine 208 may determine that the user may be getting ready to check out. In another example, the AI engine 208 may determine that the user has arrived by plane at a destination and that the user has not purchased a rental car. In some such embodiments, the AI engine 208 may predict, or recommend, that the user can purchase a rental car. The AI engine 208 may predict the event or recommended transaction by determining the intent of the user associated with the predicted event. The AI engine 208 or another component such as the policy manager 206 may determine whether the recommended transaction is in accordance with policy. Without loss of generality, the policy manager 206 determines whether the transaction is in accordance with policy in this embodiment. In some such embodiments, the policy manager 206 may determine a an amount of the transaction and compare it to a threshold amount in the policy (i.e. a remaining amount of a per-diem limit for that day). In some such embodiments, if the amount of the transaction is less than the threshold, then the policy manager 206 may approve of the transaction predicted or recommended by the AI engine 208.

The AI engine 208 may be configured to use location and the enterprise data to determine context. For example, the AI engine 208 may detect that the user has landed at the airport. The AI engine 208 has further determined, based on the enterprise data, that the user has not rented a car or reserved a ride-share yet and that the user has booked a hotel to stay at overnight. The AI engine 208 may be configured to determine the location by communicating with a global positioning system (GPS) circuit (not shown) on the mobile client device 104. The GPS circuit may determine the location by using trilateration or triangulation. The AI engine 208 and the GPS circuit may communicate using a lower level language (e.g. C++). The AI engine 208 may be configured to expose location data to other blocks using the geolocation API (e.g. send the location data to mobile application 118 to plot on a map).

Once the trip is determined, the AI engine 208 may be configured to present or facilitate presenting data, such as an identifier of the trip, the purpose of the trip, or an identifier of the event, to the mobile client device 104 (e.g. the user). In the trip purpose example, the AI engine 208 may present the trip purpose of "going to New York to secure funding from Bob." In the location example, the AI engine 208 may determine to query the user on whether the assistant server 102 may order a ride-share to drive the user from the airport to a hotel. The AI engine 208 may be configured to present or facilitate presenting a recommendation or a query to the mobile client device 104 based on the determination of the trip, the purpose of the trip, or the event. In the event prediction example, the AI engine 208 may ask the user whether the user would like the AI engine 208 to check out of the hotel on behalf of the user.

The AI engine 208 may be configured to communicate with the conversation simulator 120. The AI engine 208 may be configured to communicate with the conversation simulator 120 in a similar way to one of the embodiments described with respect to the policy manager 206.

In response to a query or a presentation of data, the AI engine 2018 may receive a response from a user via the conversation simulator 120. The response may indicate that the presented data or recommendation is incorrect or not desired. Responsive to receiving the response, the AI engine 208 may be configured to add the response to the context. The AI engine 208 may store the response, in the database 218, in a data entry associated with the trip or the transaction. The AI engine 208 may be configured to make a second determination of a trip, a purpose of the trip, and/or an event associated with the transaction based on the updated context in the identified entries.

The AI engine 208 may be configured to communicate with the merchant systems 116. For example, the AI engine may communicate through a series of messages with the merchant systems 116 to make a purchase (e.g. to book the flight). The messages may be text based or voice based. The AI engine 208 may send encoded messages to the conversation simulator 120 (e.g. an API) with contact information for the merchant systems 116. The contact information may include one or more account numbers associated with the trip or the traveler (e.g. a credit card account) and one or more identifiers of the merchant systems 116. The conversation simulator 120 may decode the messages and send the messages to the merchant systems 116 using the contact information provided. The messages may be responsive to requests by the merchant systems 116. In some embodiments, the AI engine 208 or the conversation simulator 120 selects from purchase options (e.g. flight options) and transmit the selections to the merchant systems 116. In some embodiments, the conversation simulator 120 presents the purchase options to the user. Upon receiving a selection from the purchase options, the conversation simulator 120 may send the selection to the merchant systems 116. The selection may be encoded, and the conversation simulator 120 may decode the selection before sending it to the merchant systems 116.

The AI engine 208 may facilitate performance of the transaction. Facilitating performance of the transaction may include determining what device or application will perform the transaction. The AI engine 208 may select the conversation simulator 120, the enterprise systems 108, or the TMC system 112 to perform the transaction. In some embodiments, the AI engine 208 sends instructions to the device or application that will perform the transaction. In some such embodiments, the instructions may be sent via an API. In some embodiments, determining what device or application will perform the transaction is in accordance with a policy managed by the policy manager 206. For example, if a candidate is asked to provide personally identifiable information to a merchant, the policy manager 206 may determine that the TMC system 112 performs the transaction in accordance with a privacy policy. In some such embodiments, the AI engine 208 may query the policy manager 206 to determine what device or application will perform the transaction.

The logic layer 202 may include an authenticator 210. The authenticator 210 may be configured to receive a first authentication token and a private key from the bank card system 114 (or a third party system). The first authentication token may be same as or different from a token representing the virtual card issued by the bank card system 114. The first authentication token may have a header, a payload, and a signature. The header and payload may include one or more of the user credentials, the card account number, the enterprise credentials, and/or the like. The header may include a hashing algorithm. The authenticator 210 may be configured to generate a second authentication token by hashing the header and/or payload with the private key in accordance with the algorithm included in the header. The authenticator 210 may be configured to determine that the user is authenticated by matching the signature of the first authentication token to a signature of the second authentication token.

The logic layer 202 may include a token generator 212. In some embodiments, the token generator 212 is configured to generate the token representing the virtual card issued by the bank card system. In some embodiments, the token generator 212 is configured to generate the second authentication token. The token generator 212 may be configured to generate tokens by hashing.

The logic layer 202 may include a TMC interface 214. In some embodiments, the TMC interface 214 exposes the functionality of the TMC system 112 to the other blocks of the assistant server 102. For example, the TMC interface 214 may receive a request from the AI engine 208 to select which flight to choose. The TMC interface 214 fetches a response from the TMC system 112 and exposes the response to the AI engine 208. The request from the AI engine 208 may be an API call such as a Representational State Transfer (REST) API. Thus, any TMC system 112 can be used with the assistant server 102.

The logic layer 202 may include an expense report interface 216. In some embodiments, the expense report interface 216 exposes the functionality of the expense report system 110 to the other blocks of the assistant server 102. For example, the expense report interface 216 may receive a request from the AI engine 208 to provide a template for completing an expense report. The expense report interface 216 fetches a response (e.g. the template) from the expense report system 110 and exposes the response to the AI engine 208. The request from the AI engine 208 may be an API call such as a Representational State Transfer (REST) API. Thus, any expense report interface 216 can be used with the assistant server 102.

The hardware layer 204 may include one or more physical resources for storing data, such as central storage server. The one or more physical resources may include the database 218. The database 218 may be configured to store the profiles 222, the enterprise data 224, and the policies 226. The database 218 may include data entries. The assistant server 102 (e.g. the processing unit 220 thereon) may be configured to generate the data entries. The assistant server 102 may generate the data entry by writing data to one or more addresses, which may be contiguous or non-contiguous. The one or more addresses written to may be one or more addresses that are least recently used.

In some embodiments, the assistant server 102 generates a data entry in the database 218 for every profile of the profiles 222. The profiles 222 may include credentials of users and virtual cards (e.g. tokens) accessible by the users. In some embodiments, the assistant server 102 generates a data entry in the database for one or more transactions associated with the same goal. In some embodiments, the assistant server 102 generates a data entry in the database 218 for one or more transactions associated with, or made during, a trip. Each transaction may be a purchase, a transfer of money, a registering for an event, a checking out of a hotel, or the like. Each transaction may be associated with an event. Events included in the trip may be a flight, a rideshare, sales conference, a hotel stay, a dinner, and the like. In some embodiments, more than one transaction may be associated with a same event (e.g. a hotel stay is associated with making a reservation including paying for a hotel stay, checking into the hotel, and checking out of the hotel). In some embodiments, the data entry for a profile can be linked to all trips associated to the profile. Thus a frequent traveler's behavior can be tracked across the many trips associated with the frequent traveler. In some embodiments, the assistant server 102 generates data entries for each transaction. The data entry for the transaction may include the event it is associated with and transaction details such as items purchased, amount paid, and attached files such as receipts and invoices.

In some embodiments, the database 218 includes the enterprise data 224. The enterprise data 224 may include a copy of some or all of the email 126, the calendar 128, and the CRM 130. The assistant server 102 may generate data entries for each data unit (e.g. an email correspondence, a calendar entry, a CRM entry) of the enterprise data 224. The enterprise data 224 may be organized in an intuitive manner. For example, an email thread of many email correspondences is in the database, the email correspondences of the email thread may be stored in contiguous data entries. The enterprise data may be stored as portable document format (PDF) files, tagged image file format (TIFF) files, JavaScript Object Notation (JSON) files, spreadsheet files, text files, the like, or a combination thereof.

In some embodiments, the database 218 includes the policies 226. The assistant server 102 may generate data entries for each of the policies 226. The policies 226 may include policies of the enterprise systems 108, policies of the expense report system 110, policies of the TMC system 112, policies of the bank card system 114, policies of the merchant systems 116, and/or the like.

The database 218 may be configured to store data and/or computer instructions for facilitating the processes described herein. The database 218 may include or may be part of a memory. The memory may include tangible, non-volatile memory random-access memory (NVRAM), random access memory (RAM), read only memory (ROM), EEPROM, EPROM, Flash Memory, hard disk storage, a floppy disk, optical disk (e.g., compact disk-read only memory (CD-ROM), digital video disk (DVD)), a magnetic disk, a memory chip, or any other suitable memory from which processor 303 can read instructions. The database 218 may include object code components, script components, or any other type of information structure for supporting the various activities and information structures described herein.

The hardware layer 204 may include the processing unit 220. The processing unit 220 may be configured to write data (e.g. the enterprise data 224) to the database 218, read data from the database 218, and execute instructions stored on the database 218. The processing unit 220 is implemented as a general-purpose processor, a microprocessor, an application-specific integrated circuit (ASIC), one or more field-programmable gate arrays (FPGA), a digital signal processor (DSP), or other suitable electronic processing components. In many implementations, the processing unit 220 may be a multi-core processor or an array of processors.

Referring back to FIG. 1, the mobile client device 104 is configured to communicate with the assistant server 102, including sending and receiving request, resources, and data, over a communication network. The mobile client device 104 may be under control of a user. The user may be an employee of the enterprise, a non-employee (e.g. a vendor, a customer, or an interview candidate). The user may be a frequent traveler or an infrequent traveler. The mobile client device 104 may be configured to establish a session with the assistant server 102. The session may be encrypted using secure sockets layer (SSL). The mobile client device 104 may be a smart phone, a tablet, a watch, glasses, a laptop, a desktop, a thin client, or any other device that can be carried with the user when the user is traveling.

The mobile client device 104 may execute, operate, or otherwise provide an application (e.g. the mobile application 118). The mobile application 118 may be configured to provide a graphical user interface through which the mobile client device 104 may render data received from the assistant server 102. The mobile application 118 may be configured to present one or more options to be selected by the user. The mobile application 118 may be configured to receive a selection from the user via input interfaces (e.g. a keyboard, a touchscreen, voice, and the like) and forward the selection to the assistant server 102. For example, options for flying from San Francisco to New York may be presented in the mobile application 118. The user may select one of the options displayed, and the selection is sent to the assistant server 102. The mobile application 118 may be configured to access the assistant server 102 through a secure channel (e.g. a VPN tunnel). The mobile application 118 may be configured to be installed by the mobile client device 104. In some embodiments, the mobile client device 104 may include a web-based application configured to have all functionalities of the mobile application 118. In some embodiments, the mobile application 118 may reside on the assistant server 102 and the mobile client device 104 may access the mobile application 118 by a remote-display protocol, such as the Remote Desktop Protocol (RDP).

The mobile application 118 may include a conversation simulator 120. The conversation simulator 120 may be configured to conduct a conversation and simulate how a human would behave as a conversational partner. The conversation simulator 120 may be configured to work seamlessly with the assistant server 102 to provide the user of the mobile client device 104 assistance or access to information. The conversation simulator 120 may be configured to communicate with the user via text messages or the like.

The mobile client device 104 may include a mobile wallet 122. The mobile wallet 122 may be configured to store virtual cards issued from the one or more bank card systems 114. The virtual cards may be embodied as tokens or account numbers. In some embodiments, the mobile wallet 122 may be configured to store links to the virtual cards stored in the assistant server 102. The mobile application 118 may be configured to retrieve the virtual cards by accessing and displaying the link and having the user select the link. In some embodiments, the mobile wallet 122 is only directly accessible by the mobile application 118 (e.g. only the mobile application 118 can write to or read from any database and/or memory in the mobile wallet 122). The mobile wallet 122 contents may be encrypted and the mobile application 118 includes a secret key to decrypt the mobile wallet 122 contents. The mobile wallet 122 may be a web application that the user can interact with through a web browser. The mobile wallet 122 may be a mobile application that is installed on the mobile client device 104. The mobile wallet 122 may be a third-party application.

The enterprise client device 106 is configured to communicate to the assistant server 102. The enterprise client device 106 may be under control of an enterprise user, such as an administrator, a hiring manager, a chief financial executive, or the like. The enterprise client device 106 may be configured to establish a session with the assistant server 102. The session may be encrypted using SSL. The enterprise client device 106 may be configured to communicate to the assistant server 102 through a private enterprise network such as a local area network (LAN). In some embodiments, the enterprise client device 106 may retrieve the enterprise data from the enterprise systems 108 and forward to the assistant server 102. The enterprise client device 106 may include a laptop, a desktop, a thin client, or any other device capable of communicating with the assistant server 102.

The enterprise client device 106 may include a web browser 124 configured to provide a web interface to the assistant server 102. The web browser 124 may be configured to access web-based applications running on the assistant server 102 and render the web-based applications on a display of the enterprise client device 106. The web browser 124 may be a standard browser or an embedded browser in a client application. The web browser 124 may include plug-ins, such as a Java browser plug-in, to run or access applications that do not use a programming language native to the enterprise client device 106. In some embodiments, the enterprise client device 106 may include a native application having all the functionality of the web-based application rendered in the web browser 124.

The enterprise systems 108 may be configured to store the enterprise data. The enterprise systems 108 may include enterprise data such as the email 126, the calendar 128, and the CRM 130. The email 126 may include multiple email correspondences. The email correspondences may include correspondences between device of the private enterprise network and correspondences to devices outside of the private enterprise network. The calendar 128 may include calendar entries including appointments and meeting invites. The CRM 130 may include customer contacts, interactions with customers and potential customers, sales and business objectives, analytics. The enterprise systems 108 may be on-premises or may be stored on a cloud hosted by a service provider. In some embodiments, the assistant server 102 directly accesses the enterprise systems 108.

The virtual assistant system 100 further includes the expense report system 110. The expense report system 110 may be configured to create, approve, receive, or process expense reports, or send expense report templates to be filled out with transaction data by other blocks in the virtual assistant system 100. The expense report system 110 may be accessible via the private enterprise network. The expense report system 110 may include a software program provided by a service provider. The software program may be implemented as a native application or a web-based application. In some embodiments, the expense report system 110 is included in the enterprise systems 108.

The virtual assistant system 100 further includes third party systems, such as the TMC system 112, the bank card system 114, and the merchant systems 116. The assistant server 102 may be configured to communicate with each of the third party systems via a public network such as the internet. The TMC system 112 may be configured to provide travel management services such as interfacing between the enterprise and an airline to purchase a flight. The bank card system 114 may be configured to issue bank cards to customers of the bank, such as the enterprise. The merchant systems 116 may be the systems that the assistant server 102, the mobile client device 104, or the TMC system 112 may interface with to complete a transaction (e.g. to purchase a flight, a car, a hotel, a meal, or the like).

Each of the elements or entities of the system 100 is implemented in hardware, or a combination of hardware and software, in one or more embodiments. Each component of the system 100 may be implemented using hardware or a combination of hardware or software detailed above in connection with FIGS. 1-2. For instance, each of these elements or entities can include any application, program, library, script, task, service, process or any type and form of executable instructions executing on hardware of a assistant server 102. The hardware includes circuitry such as one or more processing units 218 in one or more embodiments. Each of the one or more processors is hardware.

Figure 3:
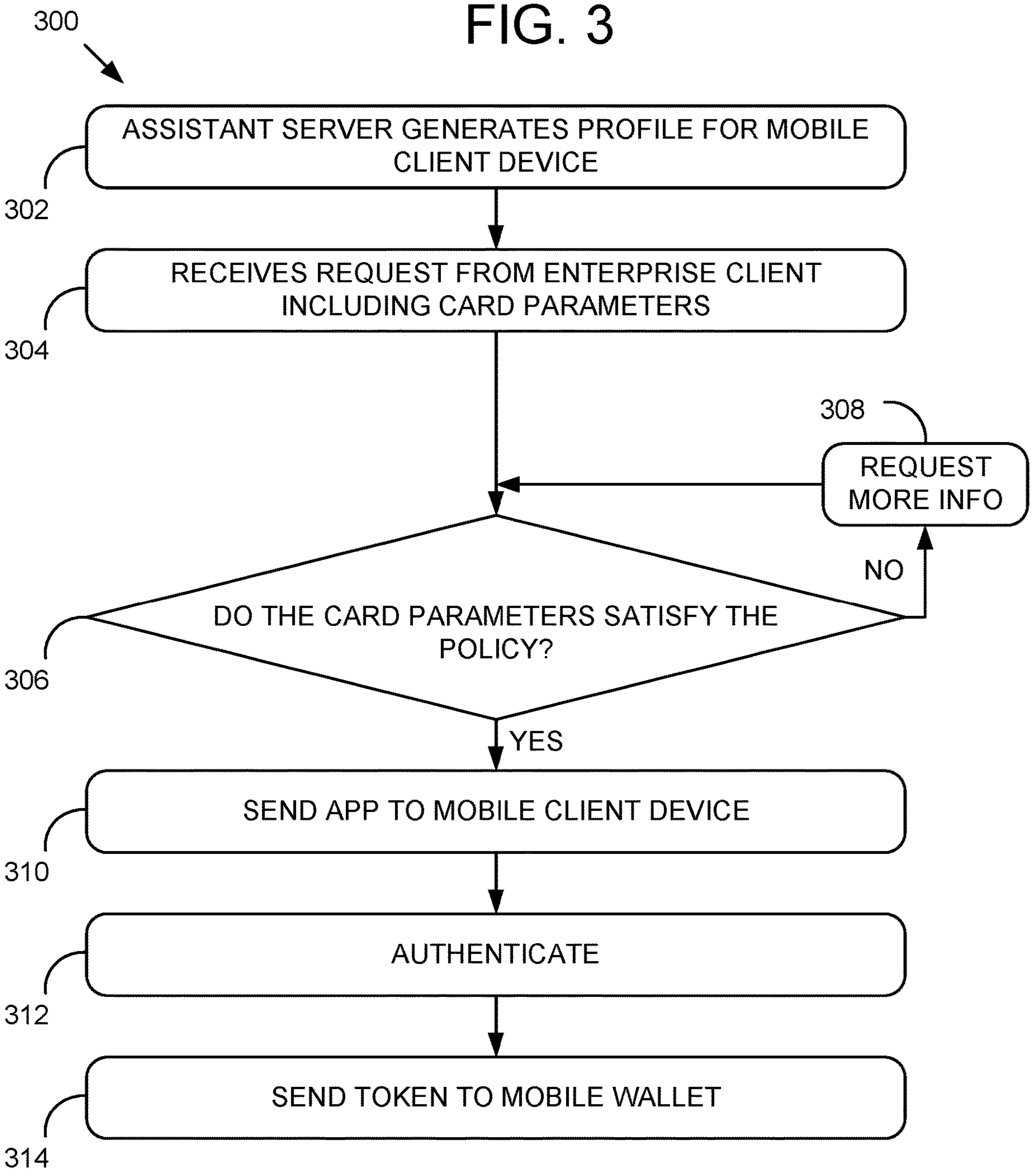
FIG. 3 illustrates an example method of activating a card, according to some embodiments.

Referring now to FIG. 3, a method 300 for activating a card is shown. The method may be implemented using, or performed by, the assistant server 102 detailed herein in connection with FIGS. 1-2. Additional, fewer, or different operations may be performed in the method 300 depending on the embodiment. In brief overview of the method 300, the assistant server generates a profile for a mobile client device (302). The assistant server receives a request from an enterprise client device including card parameters (304). The assistant server determines whether the card parameters satisfy a policy (306). The assistant server requests more information in response to determining that the card parameters do not satisfy the policy (308). The assistant server sends the mobile application to the mobile client device (310). The assistant server authenticates the user of the mobile client device (312). The assistant server sends a token to a mobile wallet in the mobile client device (314).

At operation 302, an assistant server, such as the assistant server 102, generates a profile, such as the profile 222, for a mobile client device, such as the mobile client device 104. Generating a profile for the mobile client device may include sending a request for credentials of a user of the mobile client device, receiving the user credentials, and storing the user credentials in a database, such as the database 218. The user credentials may include a name, a home address, a date of a scheduled event associated with the user, or other information relevant to activating a card. Sending the request for the user credentials may include sending a request to a mobile application, such as the mobile application 118, on the mobile client device. Receiving the user credentials may include receiving the user credentials from the mobile application. Generating a profile for the mobile client device may include sending a web page with one or more queries to be displayed on a web browser, such as the web browser 124, to the mobile client device, receiving one or more responses to the one or more queries from the mobile client device, and storing the one or more inputs in the database. The queries may include a request for user credentials.

At operation 304, the assistant server receives a request from an enterprise client device, such as the enterprise client device 106, including card parameters. Receiving the request from the enterprise client device may include receiving a request for a card limit, a card expiration date, one or more categories of transactions for which the card is authorized to make the transaction, and/or the like. Receiving the request from the enterprise client device may include receiving an API call from the web browser on the enterprise client device. Receiving the request from the enterprise client device may be responsive to generating, by the assistant server, the profile for the mobile client device.

At operation 306, the assistant server determines whether the card parameters satisfy a policy. Determining whether the card parameters satisfy the policy may include identifying the policy. The policy may be one of one or more policies stored in the database. Identifying the policy may be based on the user of the mobile client device. For example, a first policy may be provided for a user that is a frequent traveler and a second policy may be provided for a user that is an infrequent traveler. Identifying the policy may be based on the location of the mobile client device or the enterprise client device. For example, a first policy may be provided for an enterprise client device located in the eastern time zone, and a second policy may be provided for an enterprise client device located in the western time zone. Identifying the policy may be based on a bank card system, such as the bank card system 114, issuing the card. The enterprise may subscribe to different policies with different banks based on the respective service level agreements (SLA). Determining whether the card parameters satisfy the policy may include comparing the card parameters to thresholds specified by the policy. Responsive to the card parameters falling in an acceptable range within the thresholds specified by the policy, the assistant server determines that the card parameters satisfy the policy. In some embodiments, in response to determining that the card parameters satisfy the policy, the assistant server sends a request to the bank card system for a card with the card parameters and the bank card system issues a card for the mobile client device to the assistant server. In some embodiments the bank card system sends an account number or a token to the assistant server.

At operation 308, the assistant server requests more information in response to determining that the card parameters do not satisfy the policy. In some embodiments, the assistant server requests more information responsive to determining that the card parameters do not satisfy the policy. Requesting more information may include requesting reasons why a particular card parameter was requested. For example, if a ten thousand dollar limit was requested, the assistant server may request to know why the ten thousand dollar limit is needed. The policy may have a first threshold for the card limit and the policy may require the reasons for a limit above the first threshold. Requesting more information may include offering a second card parameter. For example, if a ten thousand dollar limit was requested, the assistant server may offer five thousand dollars. In some embodiments, responsive to requesting more information, the assistant server receives further inputs from the mobile client device and returns to operation 306.

At operation 310, the assistant server sends the mobile application to the mobile client device. In some embodiments, the assistant server sends the mobile application to the mobile client device responsive to determining that the card parameters satisfy the policy. Sending the mobile application to the mobile client device may include sending the mobile application to a file location in the mobile client device. Sending the mobile application to the mobile client device may include sending the mobile application in an encrypted or compressed form to be decrypted or decompressed by the mobile client device. Sending the mobile application to the mobile client device may include sending a disclaimer of terms and conditions for using the mobile application. The mobile application may be encrypted in data encryption standard (DES) or advanced encryption standard (AES). Sending the mobile application to the mobile client device may include sending the mobile application to the mobile client device responsive to receiving a request from the mobile client device to send the mobile application (for example, by clicking on a link displayed in the web browser).

At operation 312, the assistant server authenticates the mobile client device. Authenticating may include receiving a token including a header, a payload, and a signature. Authenticating may include receiving a key. In some embodiments, authenticating includes receiving the token from the bank card system. Authenticating may include generating a second signature by hashing the header and/or payload with the key in accordance with an algorithm specified in the header. Authenticating may include comparing the second signature to the first signature. Authenticating may include, responsive to determining that the second signature matches the first signature, determining that the mobile client device is authenticated.

At operation 314, the assistant server sends the token to a mobile wallet in the mobile client device. In some embodiments, the assistant server receives the token during any subsequent requests, by the mobile client device, to initiate, process, or complete a transaction. In some embodiments, the mobile wallet is a secure database that is only accessible by the mobile application. Sending the token to the mobile wallet may include sending a password to the mobile client device. In some embodiments, the mobile application accesses the token by entering in the password.

Figure 4:
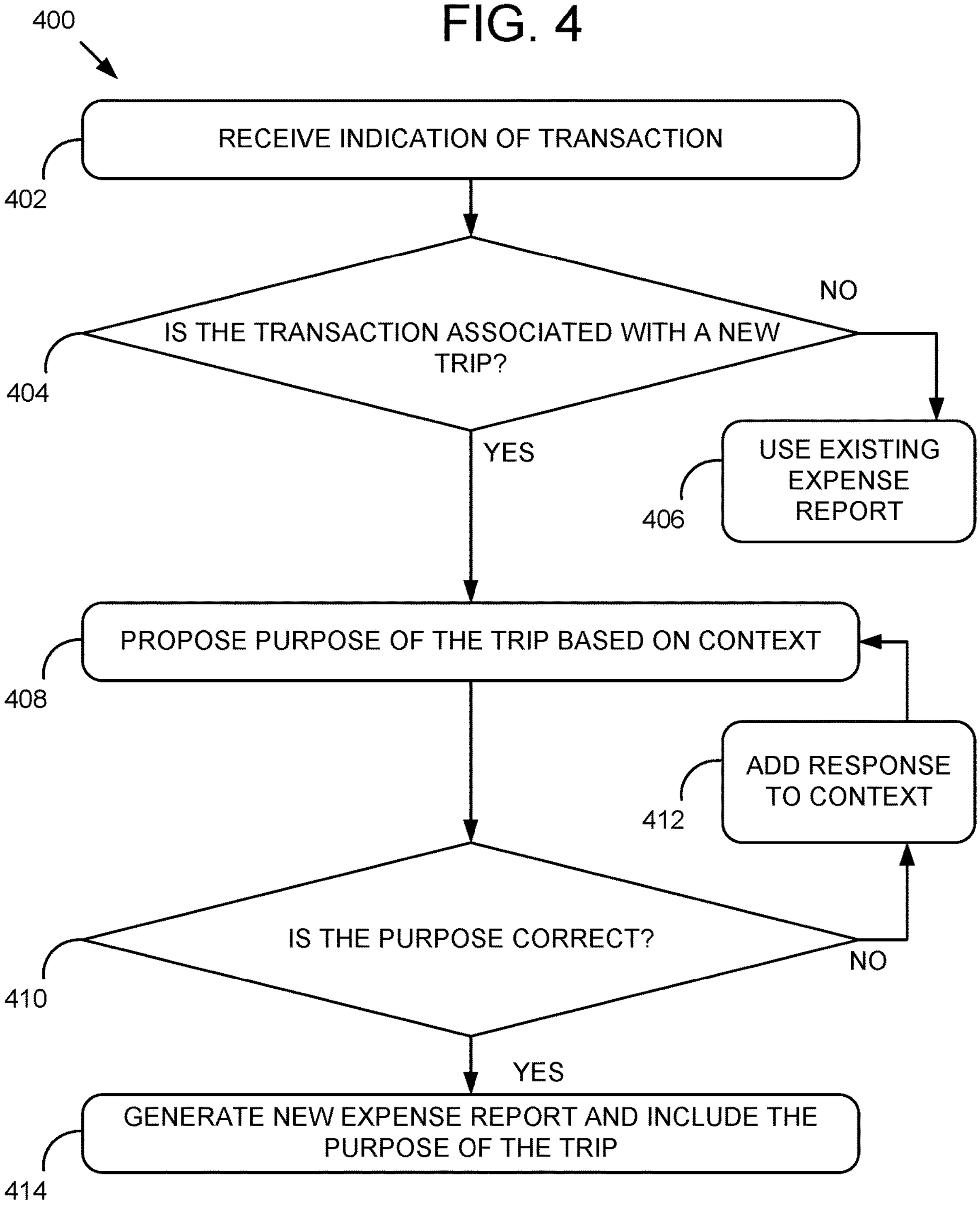
FIG. 4 illustrates an example method of creating an expense report, according to some embodiments.

Referring now to FIG. 4, a method 400 for creating an expense report is shown. The method may be implemented using, or performed by, the assistant server 102 detailed herein in connection with FIGS. 1-2. Additional, fewer, or different operations may be performed in the method 400 depending on the embodiment. In brief overview of the method 400, the assistant server receives indication of a transaction (402). The assistant server determines whether the transaction is associated with a new trip (404). The assistant server uses an existing expense report in response to determining that the transaction is not associated with the new trip (406). The assistant server proposes a purpose of the trip based on context in response to determining that the transaction is associated with the new trip (408). The assistant server determines whether the proposed purpose is correct (410). The assistant server adds a response to the context responsive to determining that the purpose is not correct (412). The assistant server generates the new expense report including the proposed purpose of the trip in response to determining that the purpose is correct (414).

At operation 402, the assistant server receives indication of a transaction. Receiving the indication of the transaction may include receiving an indication that a transaction has been completed (e.g. authorized and settled). Receiving the indication of the completed transaction may include receiving an invoice, a receipt, and/or the like. Receiving the indication of the transaction may include receiving indication of a flight purchase, a hotel purchase, a meal purchase, and the like.

At operation 404, the assistant server determines whether the transaction is a transaction associated with a new trip. Determining whether the transaction is a transaction associated with a new trip may include determining a type of the transaction. For example, if the transaction is a purchase for a flight or a train ride, the transaction may be automatically associated with the new trip. In some embodiments, upon determining whether the transaction is a transaction is associated with a new trip, the assistant server will verify whether the determination is correct.

At operation 406, the assistant server uses an existing expense report in response to determining that the transaction is not a transaction associated with the new trip. Using an existing expense report may include adding the transaction as a new entry to the existing expense report.

At operation 408, the assistant server proposes a purpose of the trip based on context. Proposing the purpose of the trip based on context may include accessing enterprise data, such as the enterprise data 224, including emails, calendars, and CRM, in the database. Proposing the purpose of the trip based on context may include filtering the enterprise data to retain only enterprise data related to the trip. For example, the assistant server may filter calendar entries to retain only calendar entries on the day of the transaction or on the day of transportation scheduled in accordance with the transaction. In another example, the assistant server may filter email correspondences to only email entries including names of places that are associated with the transaction. Proposing the purpose of the trip based on context may include narrowing the purpose based on the filtered data. For example, a first email that includes the name of the place associated with the transaction may further narrow the purpose (e.g. pitch a potential customer). Proposing the purpose of the trip based on context may include aggregating multiple instances entries of the filtered data.

At operation 410, the assistant server determines whether the purpose is correct. Determining whether the purpose is correct may include sending a request to the mobile client device to confirm whether the purpose is correct, and receiving a response from the mobile client device affirming or denying that the purpose is correct. Determining whether the purpose is correct may include requesting from the mobile client device to select a category relating to the trip. For example, the assistant server may request from the mobile client device to identify whether the trip is associated with a potential customer, a current customer, a potential vendor, or a current vendor. Determining whether the purpose is correct may include requesting from the mobile client device to state what the purpose of the trip is.

At operation 412, the assistant server adds the response to the context responsive to determining that the proposed purpose is incorrect. Upon adding the response to the context, the assistant server may iterate operation 408 to propose a second purpose. Adding the response to the context may include storing the response in the database.

In some embodiments, the method 400 may include identifying what policy needs to be enforced and enforcing the identified policy. Identifying the policy may be similar to identifying a policy in operation 306, with respect to FIG. 3. Enforcing the identified policy may include determining whether the expense report satisfies the policy. Determining whether the policy is satisfied may be similar to determining whether a policy is satisfied in operation 306, with respect to FIG. 3. Enforcing the identified policy may include requesting more information in response to determining that the expense report does not satisfy the policy. Requesting more information may be similar to requesting more information in operation 308, with respect to FIG. 3.

At operation 414, the assistant server generates a new expense report and includes in the new expense report the purpose of the trip. In some embodiments, generating the new expense report is responsive to determining that the proposed purpose of the trip is correct. Generating the new expense report may include generating a new data entry in the database and storing the transaction data in the new data entry, the purpose and the enterprise data associated with the trip in the new data entry. Generating the new expense report may include generating a first data entry and a second data entry. The first data entry includes any data relating to the trip (e.g. the purpose, a scope of travel, a length of the travel, and the like). The second data entry includes any data relating to the transaction (e.g. an amount paid in the transaction). Generating the new expense report may include setting a status for the new expense report to pending. Generating the new expense report may include not closing the new expense report until the status is changed from pending to closed.

Figure 5:
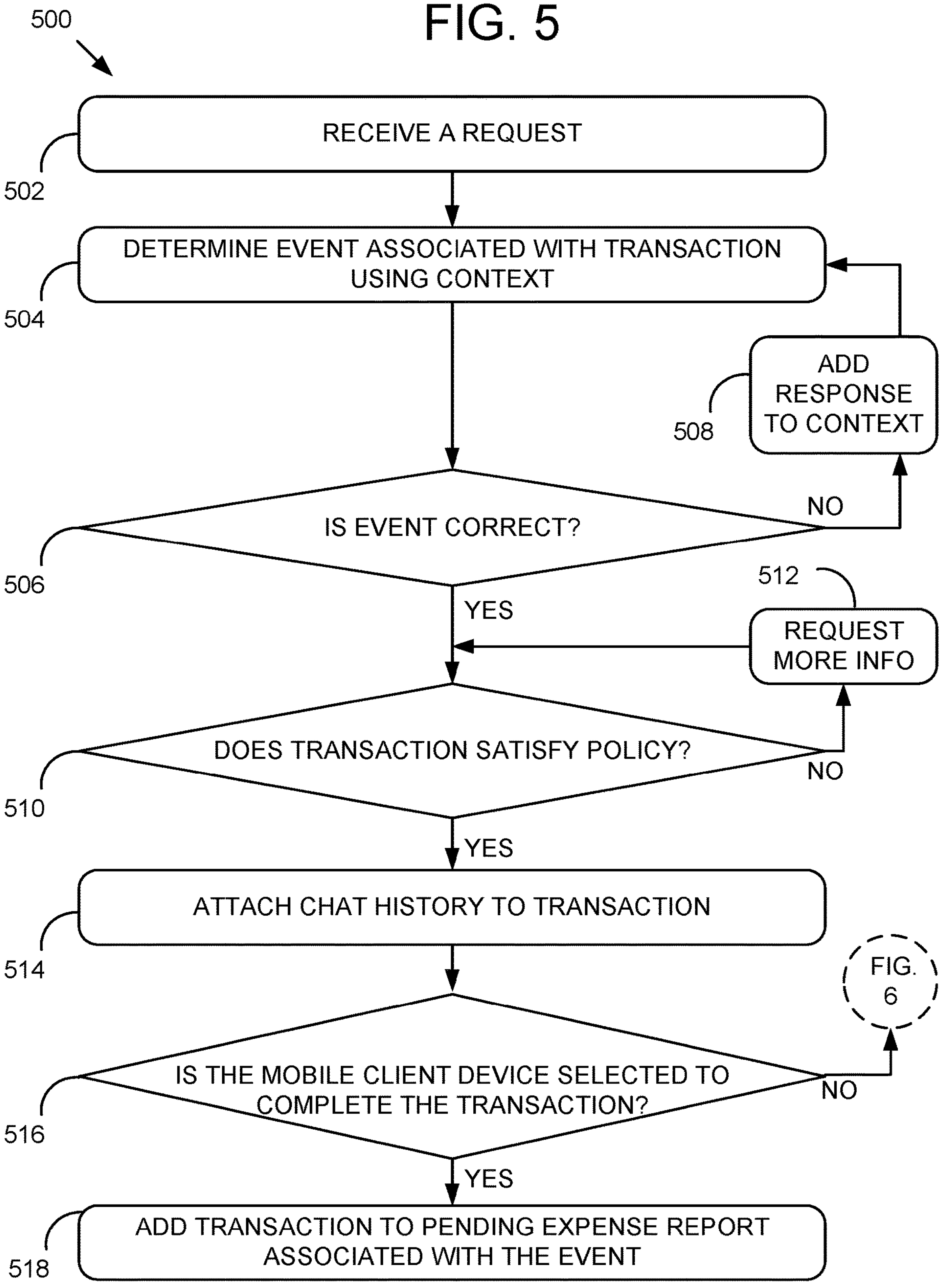
FIG. 5 illustrates an example method of purchasing via a mobile wallet, according to some embodiments.

Referring now to FIG. 5, a method 500 for purchasing via the mobile wallet is shown. The method may be implemented using, or performed by, the assistant server 102 detailed herein in connection with FIGS. 1-2. Additional, fewer, or different operations may be performed in the method 500 depending on the embodiment. In brief overview of the method 500, the assistant server receives indication of a transaction (502). The assistant server determines the event associated with the transaction based on context (504). The assistant server determines whether the event is correct (506). The assistant server adds a response to the context responsive to determining that the event is not correct (508). The assistant server determines whether the transaction satisfies a policy (510). The assistant server requests more information responsive to determining that the transaction does not satisfy the policy (512). The assistant server attaches a chat history to the transaction (514). The assistant server determines whether the mobile client device is selected to complete the transaction (516). The assistant server adds the transaction to a pending expense report associated with the event (518).

At operation 502, the assistant server receives a request. Receiving the request may include receiving a request for the transaction from the mobile client device, the enterprise client device, the TMC system, the bank card system. Receiving the request for the transaction may include receiving a request to approve a transaction that has been initiated or completed by the mobile wallet of the mobile client device. Receiving a request to approve the transaction may include receiving an indication that the transaction was made using the token in the mobile wallet. Receiving the indication that the transaction was made using the token in the mobile wallet may include receiving the token. In some embodiments, upon receiving the token, the assistant server validates the signature of the token.

At operation 504, the assistant server determines the event associated with the transaction based on context. Determining the event associated with the transaction based on context may include accessing the enterprise data from the database. Determining the event based on context may include identifying relevant information. Identifying relevant information may include matching first words associated with the transaction to second words from entries in the enterprise data (e.g. calendar entries, CRM entries, and email correspondences). For example, if the transaction is a coffee purchase, the assistant server seeks to find entries in the enterprise data that include the first coffee. In some embodiments, identifying relevant information may include finding a genus-species relationship between the second words and the first words. For example, if the transaction is a coffee purchase, the assistant server may determine that a second word "meal" is a genus of the first word "coffee." The assistant server may determine the genus-species relationship based on searching the first word in a dictionary or a database of genus-species relationships. The assistant server may similarly determine that some of the enterprise data include the word "meal." Determining the event associated with the transaction based on the context may include extracting further information from the enterprise data that gives context to the transaction. For example, a calendar entry may be for "meeting with John," and a transaction during the meeting is a purchase for coffee. The assistant server may determine based on the transaction and the calendar entry that the event is "coffee with John." In some embodiments, more information may be extracted, such as a purpose of the event, a time of the event, a place of the event, people associated with the event, and the like.

At operation 506, the assistant server determines whether the event is correct. Determining whether the event is correct may include sending a request to the mobile client device to confirm whether the event is correct, and receiving a response from the mobile client device affirming or denying that the event is correct. The request may be sent by the conversation simulator 120. Determining whether the event is correct may include requesting from the mobile client device to select a category relating to the event. For example, the assistant server may request from the mobile client device to identify whether the event category is a flight, a rental car, a ride-share, a meal, a hotel, or the like. Determining whether the event is correct may include requesting from the mobile client device to state what the event is.

At operation 508, the assistant server adds the response to the context responsive to determining that the proposed event is incorrect. Upon adding the response to the context, the assistant server may iterate operation 408 to propose a second event. Adding the response to the event may include storing the response in the database.

At operation 510, the assistant server determines whether the transaction satisfies a policy. Determining whether the transaction satisfies the policy may include comparing an amount of dollars spent in the transaction to a maximum spending amount in accordance with the policy. Comparing the amount of dollars spent to the maximum spending amount may include identifying the maximum spending amount in the policy based on a category. In some embodiments, a first category (e.g. a hotel purchase) has a first maximum spending amount and a second category (e.g. a meal purchase) has a second maximum spending amount lower than the first maximum spending amount. Determining whether the transaction satisfies the policy may include comparing the transaction to a list of allowed transactions in accordance with the policy. Determining whether the transaction satisfies the policy may include comparing a number of times the card associated with the transaction has been used to a maximum number of times the card may be used in accordance with the policy.

At operation 512, the assistant server requests more information in response to determining that the transaction does not satisfy the policy. The transaction may not satisfy the policy if, in accordance with policy, the amount of dollars spent in the transaction is higher than a maximum amount of spending for the transaction, the transaction is not a permitted transaction, or the number of times the card associated with the transaction has been used is greater than the maximum number of times the card may be used, or the location of the transaction is not a permitted location. In some embodiments, the assistant server requests more information responsive to determining that the transaction does not satisfy the policy. Requesting more information may include requesting reasons why transaction was made. Requesting more information may include canceling the transaction and requesting the mobile client device to use a second card for performing the transaction (e.g. making the purchase).

At operation 514, the assistant server attaches a chat history to the transaction. The chat history includes the request to the mobile client of whether the event is correct, the corresponding response, and any request for more information due to the transaction not satisfying the policy. In some embodiments, the assistant server attaches the chat history to the transaction responsive to determining that the transaction satisfies the policy. The assistant server may attach the chat history to the transaction by storing the chat history, in the database, in the data entry corresponding to the transaction.

At operation 516, the assistant server determines whether the mobile client device is selected to complete the transaction. In some embodiments, determining whether the mobile client device is selected to complete the transaction includes determining whether the mobile client device is authorized to complete the transaction in accordance with a policy. Responsive to determining that the mobile client device is selected to complete the transaction, the assistant server may determine whether the transaction has been completed. If the transaction has not been completed, the assistant server may send a request to the mobile client device to complete the transaction (e.g. by using the mobile wallet to pay online or at a payment terminal). Responsive to determining that the mobile client is not selected to complete the transaction, the steps with respect to FIG. 6 may be followed.

At operation 518, the assistant server adds the transaction to a pending expense report associated with the event. In some embodiments, adding the transaction to the pending expense report associated with the event includes mapping the event to a trip and identifying the pending expense report associated with the trip. In some embodiments, add adding the transaction to the pending expense report associated with the event includes adding the transaction to the most recently generated or modified pending expense report. In some embodiments, adding the transaction to the pending expense report includes generating a new data entry in the pending expense report and storing the transaction data in the new data entry.

Figure 6:
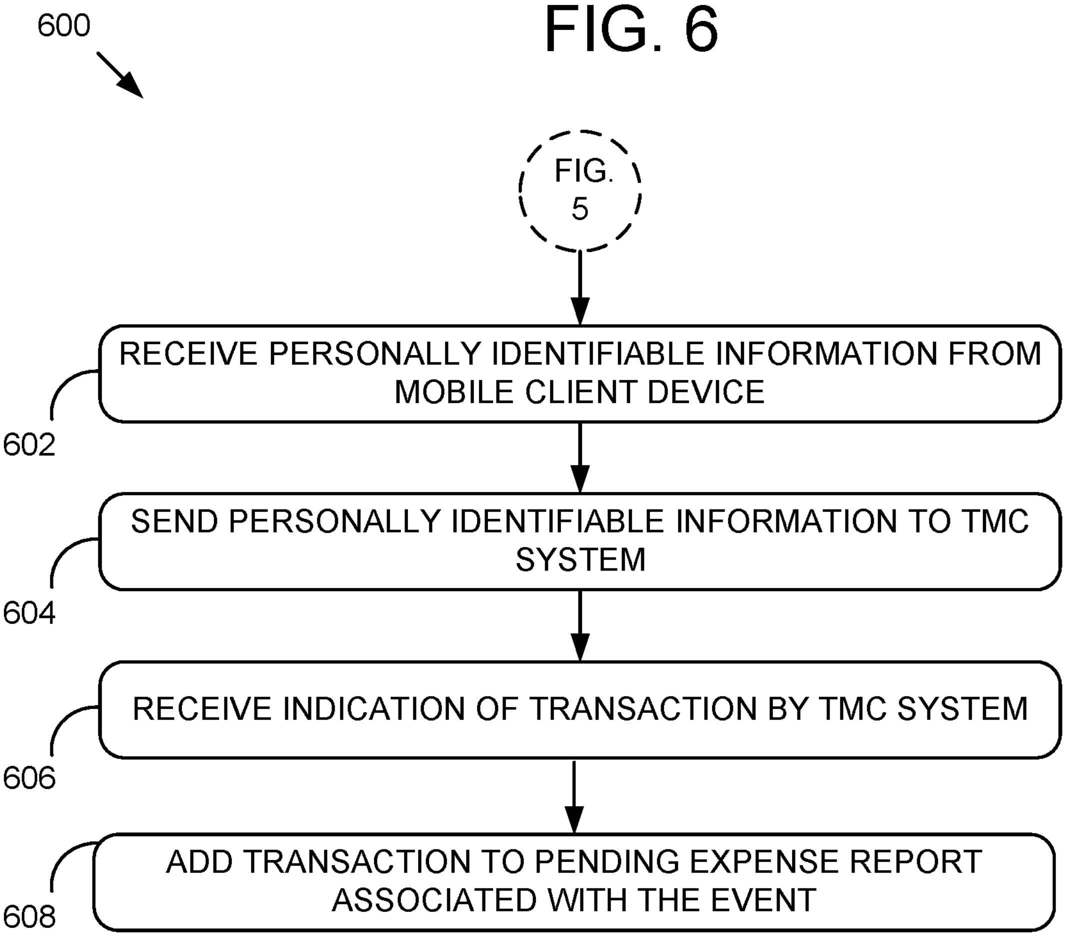
FIG. 6 illustrates an example method of completing a transaction via a travel management company system, according to some embodiments.

Referring now to FIG. 6, a method 600 for completing a transaction via TMC system is shown. The method may be implemented using, or performed by, the assistant server 102 detailed herein in connection with FIGS. 1-2. Additional, fewer, or different operations may be performed in the method 600 depending on the embodiment. In brief overview of the method 600, the assistant server receives personally identifiable information (PII) from the mobile client (602). The assistant server sends the PII to the TMC system (604). The assistant server receives an indication of completed transaction from the TMC system (606). The assistant server adds the transaction to a pending expense report associated with the transaction (608).

At operation 602, the assistant server receives PII from the mobile client device. Receiving the PII from the mobile client device may include receiving sensitive information such as social security number, age, marital status, and/or family status, and/or the like. In some embodiments, the enterprise client device does not have access to the PII. In some embodiments, the PII is encrypted and a key to encrypt the PII is located at the mobile client device. The PII may be encrypted in DES or AES. In some embodiments, receiving the PII from the mobile client device includes receiving the token that was used in authenticating the mobile client device from the mobile client device. In some embodiments, the assistant server receives PII from a users' profile or a TMC ID that is from a TMC profile.

At operation 604, the assistant server sends the PII to the TMC system. In some embodiments, sending the PII to the TMC system may include sending the PII in the encrypted format. In some embodiments, sending the PII to the TMC system may include sending a request that the PII be only used for the transaction and discarded thereafter. In some embodiments, the assistant server may send the token to the TMC system. In some embodiments, the assistant server or the TMC system may authenticate the user of the mobile client device by validating a signature of the token.

At operation 606, the assistant server receives an indication of completed transaction from the TMC system. Receiving the indication of the completed transaction may include receiving an invoice, a receipt, and/or the like. Receiving the indication of the completed transaction may include receiving indication of a flight purchase, a hotel purchase, a meal purchase, and the like. Responsive to receiving the indication of the completed transaction, the assistant server may attach the indication of the completed transaction to the transaction by storing the indication of the completed transaction, in the database, in a data entry associated with the transaction.

At operation 608, the assistant server adds the transaction to a pending expense report associated with the event described with respect to FIG. 5. In some embodiments, adding the transaction to the pending expense report associated with the event includes mapping the event to a trip and identifying the pending expense report associated with the trip. In some embodiments, add adding the transaction to the pending expense report associated with the event includes adding the transaction to the most recently generated or modified pending expense report. In some embodiments, adding the transaction to the pending expense report includes generating a new data entry in the pending expense report and storing the transaction data in the new data entry.

Figure 7:
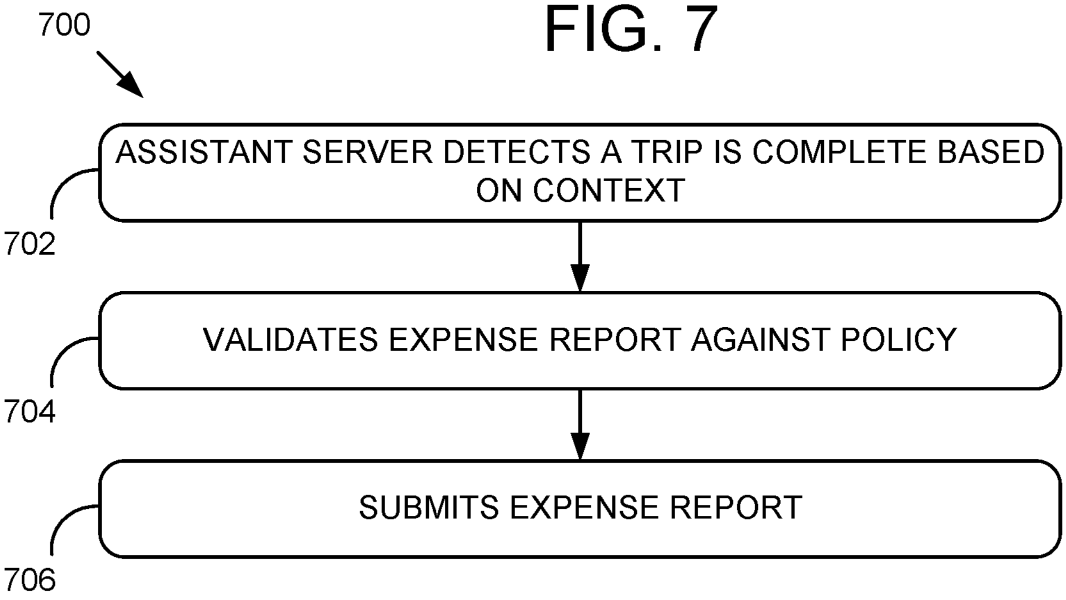
FIG. 7 illustrates an example method of closing an expense report, according to some embodiments.

Referring now to FIG. 7, a method 700 for closing an expense report is shown. The method may be implemented using, or performed by, the assistant server 102 detailed herein in connection with FIGS. 1-2. Additional, fewer, or different operations may be performed in the method 700 depending on the embodiment. In brief overview of the method 700, the assistant server detects that the trip is complete based on context (702). The assistant server validates the expense report against policy (704). The assistant server submits the expense report to the expense report system (706).

At operation 702, the assistant server detects that the trip is complete based on context. Detecting that the trip is complete based on context may include matching or correlating indicators such as enterprise data, locations, and transactions (e.g. with each other). For example, a calendar entry may say that a user of the mobile client device is in New York for a business meeting from Monday to Thursday, a transaction is completed including a plane ticket purchase leaving New York, and a location tracker on the mobile client device may detect that the user is heading towards the airport in New York on Thursday (or detects that the user has arrived at the destination of the flight from New York). Responsive to correlating the information of the trip, the assistant server may detect that the trip is complete. In some embodiments, responsive to one of the indicators not correlating with the others, the assistant server may send a request to the mobile client device to determine if the trip is complete. In some embodiments, sending the request may include sending a query of whether the mobile client device would like to extend the trip. Responsive to the mobile client device indicating a desire to extend the trip, the assistant server may check against a policy whether extending the trip is permissible.

At operation 704, the assistant server validates the expense report against policy. Validating the expense report against the policy may include identifying the policy that the assistant server applies to the expense report. Identifying the policy that the assistant server applies may be based on a location of the trip, a location of the enterprise client device, categories of each of the completed transactions, one or more bank cards used to complete the transaction, and the like. Validating the expense report against the policy may include validating that the amount spent is below a threshold of maximum spent in accordance with policy. Validating the expense report against the policy may include validating, for each day, that a per-diem maximum in accordance with policy was not exceeded. Validating the expense report against the policy may include validating that the transactions were completed with merchants local to location of the trip. Validating the expense report may include checking that all information necessary for an expense report has been provided, such as the user's profile, transaction amounts, invoices and receipts, whether the expense report was filled in accordance to policy, and the like.

At operation 706, the assistant server submits the expense report to the expense report system. Submitting the expense report to the expense report system includes submitting the transaction data (e.g. what was purchased, for how much), any chat history between the assistant server and the mobile client device, any available receipts and/or invoices, and the like. In response to submitting the expense report, the assistant server may receive, from the expense report system, an message indicating whether the expense report has been properly completed.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

receiving an indication that a transaction was completed;

determining a transaction purpose of the transaction, wherein the determining includes:

retrieving one or more entries, each of the one or more entries being one or both of: (a) within a time frame of the transaction and (b) contain words associated with the transaction;

identifying one or more parameters of the one or more entries by parsing sentences in the entries into the one or more parameters;

associating metadata with the identified one or more parameters, wherein the metadata identifies each parameter as a type of object including place, time, people, or mode of transportation;

determining a first potential transaction purpose, wherein the determining includes providing, input into a machine learning model, the input being based on the one or more parameters and the metadata;

transmitting the first potential transaction purpose to a mobile device;

receiving, from the mobile device, a first indication that the first potential transaction purpose is incorrect;

responsive to receiving the first indication that the first potential transaction purpose is incorrect, adding, by an AI engine of a virtual assistant computing device, the first indication to context associated with the transaction;

wherein determining the first potential transaction purpose further includes identifying, by the AI engine, actions in the one or more entries that give context to the transaction, wherein each action includes a word that is a verb in proximity of one of the one or more parameters, and identifying objects being modified by the actions, wherein each object includes a word that is a noun being modified by the verb;

storing, by the AI engine, the first indication in a data entry associated with the transaction in a centralized database, wherein the data entry is linked to the one or more entries;

generating a training data set based on the data entry, the one or more entries and the first indication that the first potential transaction purpose is incorrect;

training the machine learning model using the training data set, wherein the training occurs in real time responsive to receiving the first indication;

after training the machine learning model using the training data set, determining a second potential transaction purpose based on updated context retrieved from the data entry in the centralized database, wherein the determining includes using the trained machine learning model, and wherein the trained machine learning model operates on the virtual assistant computing device to determine the second potential transaction purpose without requiring additional network requests to retrieve the context;

transmitting the second potential transaction purpose to the mobile device;

receiving, from the mobile device, a second indication that the second potential transaction purpose is correct;

determining, based on the second potential transaction purpose, whether the transaction is in accordance with policy;

after determining the transaction is in accordance with policy, generating an expense report associated with the transaction; and submitting the generated expense report to an expense report system.

2. The method of claim 1, further comprising using enterprise data to determine user intent, wherein the enterprise data include data selected from the group consisting of: email entries, calendar entries, and customer relationship management data.

3. The method of claim 1, wherein determining whether the transaction is in accordance with policy includes:

determining a first amount of the transaction;

extracting a policy threshold amount from the policy; and determining whether the first amount of the transaction is less than the policy threshold amount.

4. The method of claim 1, wherein the policy includes a series of rules, checks, and verifications.

5. The method of claim 1, further comprising determining what device or system will perform the transaction.

6. The method of claim 5, further comprising, in response to determining that a travel management company system will perform the transaction, sending personally identifiable information to the travel management company system.

7. The method of claim 1, wherein generating the expense report associated with the transaction includes:

determining whether the expense report is to include a plurality of transaction or only the transaction.

8. The method of claim 1, wherein generating the expense report associated with the transaction is responsive to determining that the transaction is not associated with an existing expense report.

9. The method of claim 1, further comprising:

receiving a response indicating whether to perform the transaction; and storing the response at a server.

10. The method of claim 1, wherein the one or more entries include one or more emails.

11. A method comprising:

parsing one or more entries associated with a transaction into a plurality of parameters, wherein the parsing includes parsing sentences in the entries into the plurality of parameters;

associating metadata with the plurality of parameters, wherein the metadata identifies each parameter as a type of object including place, time, people, or mode of transportation;

determining a first potential transaction purpose, wherein the determining includes feeding the parameters and the metadata into a machine learning model;

transmitting the first potential transaction purpose to a mobile device;

receiving, from the mobile device, an indication that the first potential transaction purpose is incorrect;

responsive to receiving the indication from the mobile device that the first potential transaction purpose is incorrect, adding, by an AI engine of a virtual assistant computing device, the indication to context associated with the transaction;

wherein determining the first potential transaction purpose further includes identifying, by the AI engine, actions in the one or more entries that give context to the transaction, wherein each action includes a word that is a verb in proximity of one of the plurality of parameters, and identifying objects being modified by the actions, wherein each object includes a word that is a noun being modified by the verb;

storing, by the AI engine, the indication in a data entry associated with the transaction in a centralized database, wherein the data entry is linked to the one or more entries;

generating a training data set based on the data entry, the one or more entries and the indication;

training the machine learning model using the training data set, wherein the training occurs in real time responsive to receiving the indication; and after training the machine learning model using the training data set, determining a second potential transaction purpose based on updated context retrieved from the data entry in the centralized database, wherein the determining includes using the trained machine learning model, and wherein the trained machine learning model operates on the virtual assistant computing device to determine the second potential transaction purpose without requiring additional network requests to retrieve the context;

transmitting the second potential transaction purpose to the mobile device;

receiving, from the mobile device, a second indication that the second potential transaction purpose is correct;

determining, based on the second potential transaction purpose, whether the transaction is in accordance with policy;

after determining the transaction is in accordance with policy, generating an expense report associated with the transaction; and submitting the generated expense report to an expense report system.

12. The method of claim 11, further comprising:

adding metadata to the parameters, wherein the metadata contextualizes the parameters.

13. The method of claim 11, wherein the one or more entries include one or more emails.

14. The method of claim 11, further comprising:

retrieving the one or more entries from a server.

15. The method of claim 14, wherein retrieving the one or more entries is based on a respective entry of the one or more entries being one or both of: (a) the one or more entries being within a time around a time of the transaction and (b) the entries that contain words associated with the transaction.

16. The method of claim 11, wherein generating the training data set based on the indication includes:

identifying the one or more entries associated with the transaction; and storing the indication in a data entry associated with the transaction in the centralized database based on the one or more entries and the indication.

17. The method of claim 11, wherein generating the expense report associated with the transaction includes:

determining whether the expense report is only for the transaction or for a plurality of transactions associated with a trip.

18. A system comprising:

one or more processors configured to perform the method of claim 11.

19. The method of claim 1, wherein transmitting the first potential transaction purpose to the mobile device and receiving the first indication from the mobile device are performed via a conversation simulator configured to communicate with a user via text messages.

20. The method of claim 1, wherein responsive to receiving the first indication that the first potential transaction purpose is incorrect, the method further comprises iterating to determine the second potential transaction purpose based on the updated context.

21. The method of claim 1, wherein transmitting the first potential transaction purpose to the mobile device and receiving the first indication from the mobile device are performed via a conversation simulator, wherein the AI engine communicates with the conversation simulator by establishing a persistent connection using web sockets, and wherein the AI engine does not send further messages to the conversation simulator until receiving a response from the conversation simulator.

22. The method of claim 11, wherein transmitting the first potential transaction purpose to the mobile device and receiving the indication from the mobile device are performed via a conversation simulator, wherein the AI engine communicates with the conversation simulator by establishing a persistent connection using web sockets, and wherein the AI engine does not send further messages to the conversation simulator until receiving a response from the conversation simulator.

* * * * *